(12) United States Patent
Hansson et al.

(10) Patent No.: US 6,508,196 B1
(45) Date of Patent: Jan. 21, 2003

(54) DEVICE FOR APPLYING DROPS OF A FLUID ON A SURFACE

(75) Inventors: Jens Hansson, Danderyd (SE); Johan Kronstedt, Sollentuna (SE); William Holm, Stockholm (SE)

(73) Assignee: Mydata Automation AB, Bromma (SE)

( * ) Notice: Subject to any disclaimer, the term of this patent is extended or adjusted under 35 U.S.C. 154(b) by 0 days.

(21) Appl. No.: 09/284,292

(22) PCT Filed: Oct. 16, 1997

(86) PCT No.: PCT/SE97/01738

§ 371 (c)(1),
(2), (4) Date: Jun. 24, 1999

(87) PCT Pub. No.: WO98/16323

PCT Pub. Date: Apr. 23, 1998

(30) Foreign Application Priority Data

Oct. 16, 1996 (SE) ................................................ 9603808

(51) Int. Cl.[7] .............................. B05C 5/00; B05B 3/14; B05B 17/06; B05B 35/00; B23K 3/06
(52) U.S. Cl. ........................... 118/300; 118/323; 239/4; 239/102.2; 137/827; 417/322
(58) Field of Search ........................ 239/4, 101, 102.2, 239/533.3; 118/300, 323; 137/13, 827, 828; 366/127; 417/322; 310/26

(56) References Cited

U.S. PATENT DOCUMENTS

| | | | | |
|---|---|---|---|---|
| 3,679,132 A | * | 7/1972 | Vehe et al. ...................... 239/4 |
| 4,048,963 A | * | 9/1977 | Cottell ....................... 123/25 R |
| 4,930,701 A | * | 6/1990 | Porter ....................... 239/102.2 |
| 5,199,641 A | * | 4/1993 | Holm et al. .............. 239/102.2 |
| 5,248,087 A | * | 9/1993 | Dressler ................... 239/102.2 |
| 5,558,504 A | * | 9/1996 | Stridsberg .................... 417/322 |
| 5,868,153 A | * | 2/1999 | Cohen et al. .................. 137/13 |
| 5,868,305 A | * | 2/1999 | Watts .......................... 228/254 |

FOREIGN PATENT DOCUMENTS

| WO | WO91/12106 | 8/1991 |
|---|---|---|
| WO | WO91/12921 | 9/1991 |

* cited by examiner

Primary Examiner—J. A. Lorengo
(74) Attorney, Agent, or Firm—Birch, Stewart, Kolasch & Birch, LLP

(57) ABSTRACT

In a device for ejecting small amounts of a liquid material having accurately defined volumes from a chamber (1), the chamber has a nozzle aperture (7) and a rod (9) is mounted in or attached to a wall of the chamber (1), so that an end surface (11) of the rod is located opposite and at a small distance of the nozzle aperture (7). A driving device is coupled to the rod (9) for displacing the end surface (11) forwards and backwards inside the chamber with a very small stroke, with a high acceleration and a large force, so that a pressure wave is formed and propagates in the material in the chamber (1). The pressure wave then ejects material out of the nozzle aperture (7).

21 Claims, 1 Drawing Sheet

DEVICE FOR APPLYING DROPS OF A FLUID ON A SURFACE

The present invention relates to a device for placing small volumes of a material being in a liquid or fluid shape such as viscous media and liquid dispersions, in particular a viscous dispersion such as solder paste and different kinds of glues and adhesives, with a high speed on a substrate or base by ejecting drops of the material from a chamber through a nozzle.

BACKGROUND

When mounting electronic components on printed circuit boards and substrates it can be required that small isles or patches of solder paste are placed with a high speed and a high accuracy on such a base. Also, depositing varnishes and glues, in particular an electrically conductive adhesive, can be required. The high speed is required for the ever higher speed at which the electronic devices of today are produced.

In the published International patent application WO91/12106 a device is disclosed for depositing material, which comprises a rod, the length of which is changed when it is subjected to a suitable magnetic field. The end of the rod forms one wall of a chamber filled with the material. When the length of the rod is suddenly changed to become longer, the volume of the chamber is changed and the material is in the shape of a drop pressed out of a nozzle. In the published International patent application WO90/00852 instead the volume of the chamber is changed by making the chamber of a piezo-electrical material and subjecting it to an electric field.

In the European patent document EP-B1 0 517 767 a device is disclosed for depositing drops of a liquid material such as solder paste, glue and similar materials. The device comprises a rigid metal pipe through which material flows and which contains a nozzle in a wall of the pipe, and it further comprises a rod resting at the outside of the pipe conduit and made of an magnetostrictive material. By subjecting the rod to a magnetic field it will change its length to produce a blow on the outside of the pipe thereby locally increasing the pressure in the pipe, so that a drop of the material is ejected through the nozzle.

In U.S. Pat. No. 5,320,250 a method is disclosed for rapid dispensing of small amounts of a viscous material. A chamber containing the material has a nozzle in a wall and another wall of the chamber has the shape of a flexible, elastic diaphragm. An impact mechanism such as an electrically actuated hammer hits against the outside of the diaphragm in order to produce a change of the volume of the chamber, so that a drop is pressed out of the nozzle.

SUMMARY

It is an object of the invention to provide a device by means of which small amounts of a liquid or fluid material can be ejected from a chamber containing the material, so that one drop at a time can be ejected in an accurately defined volume or so that the liquid material is ejected in a finely divided shape.

Thus, in a device for dispensing small quantities or amounts of a material a chamber is provided having a nozzle aperture arranged in a first wall. The chamber has a second wall which is opposite and parallel to the first wall. A rod is movably mounted in or attached to the second wall in such a way that one end surface of the rod and a neighbouring portion of the envelope surface of the rod are located inside the chamber. This end surface is furthermore opposite the nozzle aperture. An actuating device is coupled to this rod in order to displace it through a short distance forwards and backwards or otherwise produce, e.g. by changing the length of the rod. Then the one end surface of the rod moves forwards and backwards inside the chamber, in the longitudinal direction of the rod, perpendicularly to the one end surface. The diameter or largest cross dimension of the rod is advantageously large compared to the diameter of the nozzle aperture. The length of stroke of the rod or equivalently the displacement of the end surface of the rod is small but the stroke movement is made with a high acceleration and a large force, so that a pressure wave is thereby formed and propagates in the viscous medium. When hitting the inlet of the nozzle channel, the pressure wave then ejects material through the nozzle. The ejection of the material is thus primarily produced by a pressure wave or a pressure shock which propagates in the material and not by a change of the volume of the chamber. Furthermore, in order that the pressure wave will efficiently act towards the nozzle aperture the end surface of the rod is advantageously located close thereto. Thus, the distance between the end surface of the rod and the inlet of the nozzle aperture is preferably small compared to the diameter of the end surface. Said diameter can be taken as equivalent to the largest dimension of the end surface as taken in a cross direction of the rod, i.e. from an edge of the end surface to an opposite edge thereof.

The displacement of the rod or its end surface can easily be produced maintaining a high accuracy of the movement without having it degraded because of wear or plays in bearings and similar reasons. Examples of suitable driving devices are electrostrictive, piezo-electrical, magnetostrictive actuators and memory metal actuators.

BRIEF DESCRIPTION OF THE DRAWING

The invention will now be described by way of a non limiting embodiment with reference to the accompanying drawing, in which.

DETAILED DESCRIPTION

Figure 1:
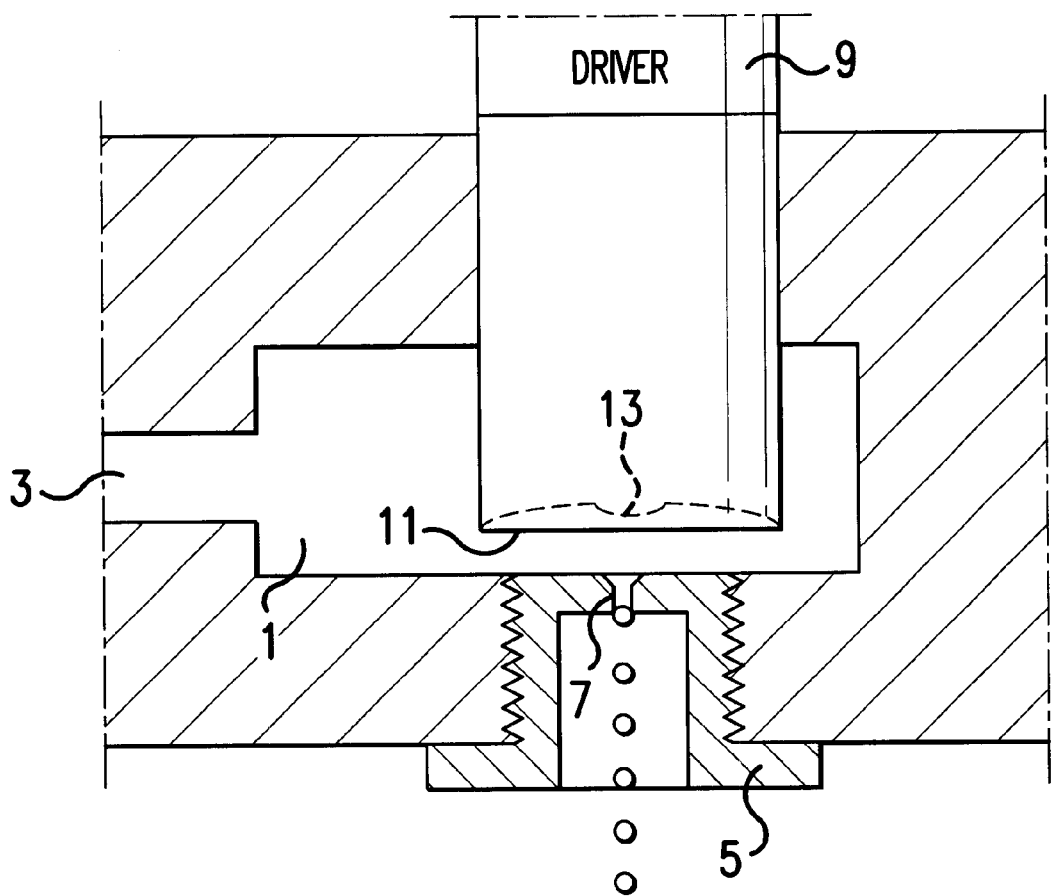
FIG. 1 is a schematic cross sectional view of a device for feeding or depositing material.

In FIG. 1 a chamber 1 made in a rigid metal block is shown, which through an opening 3 in a side surface is connected to a material container, not shown. The chamber 1 has the shape of a low cylinder having side surfaces and a top wall and a bottom wall. In the bottom wall there is a narrow outlet or nozzle aperture 7. The aperture 7 can be a channel in a nozzle 5 which is attached in a bore in the bottom wall by means of suitable cooperating threads. The nozzle 5 has a nozzle aperture 7 in the shape of a narrow channel. The inner end of the nozzle channel 7 which is located at the chamber is bevelled or shaped as a funnel. Opposite the inner end of the channel 7 a rod 9 is located. The rod 9 is slidably mounted in the wall opposite the wall in which the nozzle 5 is located, i.e. the rod is mounted in the top wall of the chamber 1. The lower end surface 11 of the rod 9 can move in directions towards and away from the nozzle 5 and the bottom wall by means of some suitable driving device or by the very construction of the rod together with a suitable actuator, not shown. For example the rod itself or its driving device, if all of the rod is to be displaced, can be based on electrostrictive, piezoelectrical or magnetostrictive materials. Some portions of the rod or driving mechanism can also be based on memory metals.

Then, if the lower end surface 11 of the rod 9 is given a sudden, very small movement downwards, towards the bottom wall and the nozzle 5, in particular towards the inner end of the channel 7, a localized pressure increase or pressure blow or shock is obtained in the material in the chamber 1 close to the lower end surface 11 of the rod 9. A shock wave is thus generated in the material in the chamber and it propagates therein away from the end surface 11, in a direction substantially perpendicular thereto. This pressure increase or pressure wave then also affects, for a suitable dimensioning, that region of the chamber 1, at which the inner channel 7 of the nozzle 5 mouths in the chamber 1. Thereby a particulate quantity such as a drop of the material in the chamber 1 will be ejected from the nozzle channel 7 at its other, outer end. The particulate quantity of material will then move freely with a high velocity in air along a path substantially coinciding with the prolongation of the longitudinal axis of the straight channel 7. The quantity can hit and thus be applied to some substrate, not shown, for example a printed circuit board or some other substrate having electrical conductor parts. In order that the pressure increase or pressure wave will efficiently act towards the nozzle channel 7, the end surface 11 of the rod 9 can be located at only a small distance of the region in which the nozzle channel 7 starts inside the chamber 1, compared to the diameter of the rod or more particularly to the diameter of its end surface. Thus, the distance can be comprised within the range of 0.05–0.5 mm, the diameter of the end surface 11 for example being 1–4 mm. The diameter of the end surface 11 is also large in relation to the diameter of the narrowest portion of the nozzle channel, which can be comprised within the range of 0.1–0.5 mm. Furthermore, the length of stroke of the end surface 11 is small compared to the diameter thereof, for example at most 0.01–0.02 mm.

The nozzle 5 is in FIG. 1 made as a threaded bushing having a basically cylindrical shape. The inner side of the nozzle is substantially flat at the surface surrounding the centrally located, coaxial channel 7. A deep cylindrical, coaxial recess is in the opposite side of the cylindrical nozzle which faces away from the chamber 1. The nozzle channel 7 then extends only a short way through the inner portion of the nozzle 5, having its outer end surrounded by the walls of the recess. The nozzle channel 7 is thus located directly connected to the main space of the chamber 1 having its inner end located in the plane of the bottom wall, what results in that a pressure increase in the chamber 1 can easily be directed, so that it will efficiently affect the nozzle channel. Other detail solutions and attachment methods of the nozzle are naturally conceivable. The end surface 11 of the rod 9 is furthermore made as a substantially flat surface located perpendicularly to the longitudinal axis of the rod and to the longitudinal axis of the channel 7 and in parallel to the inner surface of the nozzle 5 and the bottom wall and has its centre located straight above the nozzle channel 7. In particular those regions of the chamber wall which are located at and close to the inner end of the channel 7, these regions comprising the inner, upper surface of the nozzle 5, are substantially flat and have an extension at least corresponding to the extension of the end surface 11. These regions are also parallel to the end surface 11 of the rod 9. The longitudinal axes of the rod 9 and of the channel 7 can thus coincide. The end surface 11 of the rod can also be modified to comprise a concave, centrally located, shallow recess for producing an enhanced localisation of the pressure increase or a better definition of the direction of the pressure shock. Centrally in the recess in the end surface 11 a small and low, projection portion or boss 13 can be arranged, which can further increase the intensity of the pressure shock in the region centrally below the end surface 11 and thus close to the inner end of the nozzle channel.

What is claimed is:

1. A device for controlled application of drops of solder paste with a high velocity onto a substrate, comprising:

solder paste for ejection by a pressure wave through an aperture such that a drop of the solder paste will be ejected with high velocity through the aperture;

a chamber for containing the solder paste to be applied, the chamber including a first wall and a second wall, the second wall being opposite the first wall;

a nozzle aperture located in the first wall;

an inlet opening for supplying solder paste into the chamber;

a rod protruding from the second wall, the rod extending towards the first wall and having an end surface with a diameter spatially separated from but confronted immediately over the nozzle aperture to trap the solder paste between the end surface and the nozzle aperture, the diameter of the end surface of the rod being large compared to the nozzle aperture; and actuator means for the controlled application of drops of solder paste with a high velocity onto a substrate, the actuator means providing a controlled sudden displacement of the rod toward the first wall with a high acceleration of the end surface towards the nozzle aperture so that one drop of a defined volume can be ejected at a time, wherein the large diameter of the end surface of the rod impacts the solder paste located between the end surface and the nozzle aperture to produce a pressure wave in the solder paste such that a drop of solder paste will be ejected with a high velocity through the nozzle aperture, and said displacement causes the ejection of said one drop.

2. The device according to claim 1, wherein at least one connecting wall extends between and connects the first and second walls.

3. The device according to claim 1, wherein the diameter of the end surface is at least about five times the distance between the end surface and the nozzle aperture.

4. The device according to claim 3, wherein the distance between the end surface and the nozzle aperture is approximately 0.05–0.50 mm.

5. The device according to claim 4, wherein the diameter of the end surface is at least about ten times the distance between the end surface and the nozzle aperture.

6. The device according to claim 1, wherein the diameter of a narrowest portion of the nozzle aperture is approximately 0.10–0.50 mm.

7. The device according to claim 1, wherein the sudden displacement of the end surface displaces the end surface from a first position to a second position, and wherein the actuator means is arranged for providing a retracting of the end surface from the second position to the first position following the sudden displacement of the end surface.

8. The device according to claim 7, wherein the distance the end surface is displaced from the first position to the second position is over a distance of approximately 10–20 µm.

9. The device according to claim 1, wherein the diameter of the narrowest portion of the nozzle aperture is approximately 0.10–0.50 mm.

10. The device according to claim 2, wherein the extension of the chamber in a direction essentially perpendicular to an extension of the rod and the diameter of the rod are dimensioned to provide space for solder paste between the rod and the at least one connecting wall.

11. The device according to claim 1, wherein the end surface has a substantially flat shape.

12. The device according to claim 1, wherein the end surface is formed such that, in the movement of the end surface towards the nozzle aperture, a focusing of a pressure wave towards the nozzle aperture is produced in the solder paste.

13. The device according to claim 12, wherein the end surface comprises a concave, centrally located, recess.

14. The device according to claim 13, wherein the recess comprises a centrally located projecting portion.

15. The device according to claim 1, wherein the actuator means comprises a driving device arranged to displace the rod, thereby providing the controlled sudden displacement of the end surface.

16. The device according to claim 15, wherein the actuator means is at least partly formed by a piezoelectric material.

17. The device according to claim 15, wherein the actuator means is at least partly formed from a material selected from the group consisting of an electrostrictive material, a magnetostrictive material and a shape memory alloy.

18. The device according to claim 1, wherein the rod is at least partly formed by a material such that a length of the rod can be changed in a controlled fashion, and wherein the actuator means is arranged to produce a controlled rapid change in the length of the rod, thereby providing the controlled sudden displacement of the end surface.

19. The device according to claim 18, wherein the rod is at least partly formed by a piezoelectric material.

20. The device according to claim 18, wherein the rod is at least partly formed from a material selected from the group consisting of an electrostrictive material, a magnetostrictive material and a shape memory alloy.

21. A device for controlled application of drops of solder paste with a high velocity onto a substrate, comprising:

solder paste for ejection by a pressure wave through an aperture such that a drop of the solder paste will be ejected with high velocity through the aperture;

a chamber for containing the solder paste to be applied, the chamber including a first wall and a second wall, the second wall being opposite the first wall;

a nozzle aperture located in the first wall;

a rod protruding from the second wall, the rod extending towards the first wall and having an end surface with a diameter, the diameter of the end surface of the rod being large compared to the nozzle aperture and the diameter of the end surface spatially separated from but confronted immediately over the nozzle aperture to trap the solder paste between the end surface and the nozzle aperture;

an inlet opening for supplying solder paste into the chamber;

actuator means for the controlled application of drops of solder paste with a high velocity onto a substrate, the actuator means providing a controlled sudden displacement of the rod toward the first wall with a high acceleration of the end surface towards the nozzle aperture so that one drop of a defined volume can be ejected at a time, wherein the large diameter of the end surface of the rod impacts the solder paste located between the end surface and the nozzle aperture to produce a pressure wave in the solder paste such that a drop of solder paste will be ejected with a high velocity through the nozzle aperture, and said displacement causes the ejection of said one drop;

at least one connecting wall extends between and connects the first and second walls; and the first wall, the second wall and the connecting wall provide an extension of the chamber in a direction essentially perpendicular to the extension of the rod dimensioned relative to the rod to provide entrance for the solder paste between the rod and the nozzle.

* * * * *